United States Patent
Yang

(10) Patent No.: US 11,979,405 B2
(45) Date of Patent: May 7, 2024

(54) METHOD AND SYSTEM FOR PROCESSING NETWORK RESOURCE ACCESS REQUESTS, AND COMPUTER DEVICE

(71) Applicant: Hangzhou Jindoutengyun Technologies Co., Ltd., Hangzhou (CN)

(72) Inventor: Yang Yang, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/649,209

(22) Filed: Jan. 28, 2022

(65) Prior Publication Data
US 2022/0255938 A1    Aug. 11, 2022

(30) Foreign Application Priority Data
Feb. 7, 2021  (CN) .......................... 202110166359.6

(51) Int. Cl.
*H04L 9/40* (2022.01)
*H04L 41/084* (2022.01)
*H04L 41/0803* (2022.01)

(52) U.S. Cl.
CPC .......... *H04L 63/10* (2013.01); *H04L 41/0843* (2013.01); *H04L 63/1441* (2013.01); *H04L 63/205* (2013.01); *H04L 41/0803* (2013.01)

(58) Field of Classification Search
None
See application file for complete search history.

(56) References Cited

U.S. PATENT DOCUMENTS 5,486,515 A * 1/1996 Brown ................. C07D 413/04
                                                            544/101
5,678,041 A * 10/1997 Baker .................. H04L 63/102
                                                            707/999.009

(Continued)

FOREIGN PATENT DOCUMENTS

CN    107784221 A  *  3/2018  ............. G06F 21/44
CN    107784221 A      3/2018

(Continued)

OTHER PUBLICATIONS

Uriarte et al "Expressive Policy-Based Access Control for Resource Constrained Devices," Jul. 24, 2017, pp. 15-46 (Year: 2017).*

(Continued)

*Primary Examiner* — Luu T Pham
*Assistant Examiner* — James J Wilcox
(74) *Attorney, Agent, or Firm* — PROI Intellectual Property US; Klaus Michael Schmid

(57) ABSTRACT

Disclosed is a method for processing network resource access requests. The method comprises: receiving a resource access request and acquiring resource access request information; extracting user information and target resource information from the resource access request information, and requiring to establish a corresponding access mediator instance according to the user information and the target resource information; establishing the access mediator instance; and initiating an access to a target resource correspondingly by using the access mediator instance according to the resource access request information received by the access mediator instance. The network security is improved greatly.

1 Claim, 3 Drawing Sheets

(56) References Cited

U.S. PATENT DOCUMENTS

| | | | | |
|---|---|---|---|---|
| 5,696,898 A | * | 12/1997 | Baker | G06F 21/604 707/999.009 |
| 5,764,750 A | * | 6/1998 | Chau | H04Q 11/0464 370/467 |
| 5,764,890 A | * | 6/1998 | Glasser | H04L 63/08 726/11 |
| 6,140,467 A | * | 10/2000 | Ware | G01N 33/56983 530/350 |
| 6,256,739 B1 | * | 7/2001 | Skopp | H04L 63/101 709/229 |
| 6,351,776 B1 | * | 2/2002 | O'Brien | H04N 21/4147 709/227 |
| 6,377,994 B1 | * | 4/2002 | Ault | H04L 63/10 707/999.009 |
| 6,529,955 B1 | * | 3/2003 | Sitaraman | H04L 67/564 709/224 |
| 6,542,908 B1 | * | 4/2003 | Ims | G06F 9/548 |
| 6,545,005 B1 | * | 4/2003 | Baxter | C07D 239/91 514/266.3 |
| 6,552,016 B1 | * | 4/2003 | Baxter | C07K 14/461 514/254.01 |
| 6,564,325 B1 | * | 5/2003 | Travostino | H04L 63/105 726/19 |
| 6,591,304 B1 | * | 7/2003 | Sitaraman | H04L 63/10 370/469 |
| 6,628,671 B1 | * | 9/2003 | Dynarski | H04L 63/10 370/469 |
| 6,704,864 B1 | * | 3/2004 | Philyaw | H04L 41/082 713/1 |
| 6,782,508 B1 | * | 8/2004 | Bahrs | G06F 8/24 715/764 |
| 7,069,330 B1 | * | 6/2006 | McArdle | H04L 63/0227 709/227 |
| 7,174,371 B2 | * | 2/2007 | Elo | H04L 41/5064 709/220 |
| 7,263,070 B1 | * | 8/2007 | Delker | H04W 8/245 709/227 |
| 7,737,178 B2 | * | 6/2010 | Serhan | A61P 17/04 514/552 |
| 7,770,174 B1 | * | 8/2010 | Martin | H04L 63/101 713/168 |
| 7,783,735 B1 | * | 8/2010 | Sebes | H04L 63/10 709/225 |
| 7,810,137 B1 | * | 10/2010 | Harvey | H04L 63/102 726/21 |
| 7,814,531 B2 | * | 10/2010 | Khosravi | H04L 61/5014 709/225 |
| 7,912,035 B1 | * | 3/2011 | Leung | H04W 36/12 709/228 |
| 8,051,491 B1 | * | 11/2011 | Cavage | H04L 63/0227 726/16 |
| 8,166,537 B1 | * | 4/2012 | Viswanath | H04L 63/102 713/153 |
| 8,201,214 B1 | * | 6/2012 | Wallace | G06F 21/33 726/28 |
| 8,510,420 B1 | * | 8/2013 | Brandwine | H04L 67/51 709/227 |
| 8,552,171 B2 | * | 10/2013 | Tuschl | C12N 15/1079 536/23.1 |
| 8,578,456 B2 | * | 11/2013 | Lindholm | H04L 63/205 713/168 |
| 8,613,070 B1 | * | 12/2013 | Borzycki | H04L 67/104 726/8 |
| 8,631,244 B1 | * | 1/2014 | Potts | H04L 67/02 713/188 |
| 8,639,827 B1 | * | 1/2014 | Dinn | H04L 63/104 709/225 |
| 8,645,422 B2 | * | 2/2014 | Pool | H04L 63/104 713/168 |
| 8,799,989 B1 | * | 8/2014 | Liu | H04L 41/0803 709/219 |
| 8,832,811 B2 | * | 9/2014 | Horman | H04L 63/10 726/4 |
| 8,893,255 B1 | * | 11/2014 | Martini | H04L 67/564 709/238 |
| 9,037,849 B2 | * | 5/2015 | Koster | H04L 63/0823 726/10 |
| 9,042,306 B2 | * | 5/2015 | Barkan | H04W 76/34 370/328 |
| 9,053,146 B1 | * | 6/2015 | Kapoor | G06F 16/242 |
| 9,154,479 B1 | * | 10/2015 | Sethi | H04L 63/20 |
| 9,200,081 B2 | * | 12/2015 | Epshtein | C07K 16/00 |
| 9,240,996 B1 | * | 1/2016 | Sinnema | H04L 63/1416 |
| 9,461,980 B1 | * | 10/2016 | Agrawal | H04L 63/08 |
| 9,491,157 B1 | * | 11/2016 | Amdahl | H04L 67/56 |
| 9,509,688 B1 | * | 11/2016 | Magi Shaashua | H04L 63/0861 |
| 9,509,692 B2 | * | 11/2016 | Innes | H04L 63/0823 |
| 9,648,044 B2 | * | 5/2017 | Islam | H04L 63/08 |
| 9,668,130 B2 | * | 5/2017 | Bournelle | H04L 9/321 |
| 9,729,557 B1 | * | 8/2017 | Sanyal | H04L 47/125 |
| 9,779,257 B2 | * | 10/2017 | Wahl | G06F 21/604 |
| 9,853,993 B1 | * | 12/2017 | Zhou | H04L 63/1425 |
| 10,003,576 B2 | * | 6/2018 | Hopen | H04L 63/10 |
| 10,028,258 B2 | * | 7/2018 | Morper | H04W 88/12 |
| 10,116,699 B1 | * | 10/2018 | Paterson | H04L 63/20 |
| 10,122,757 B1 | * | 11/2018 | Kruse | H04L 63/10 |
| 10,298,577 B1 | * | 5/2019 | Aithal | G06F 9/45558 |
| 10,324,746 B2 | * | 6/2019 | Kumar | H04L 63/20 |
| 10,362,064 B1 | * | 7/2019 | Elliot | H04L 63/10 |
| 10,585,570 B2 | * | 3/2020 | Larson | G06F 3/04842 |
| 10,628,560 B1 | * | 4/2020 | Siranni | G06F 21/6281 |
| 10,757,104 B1 | * | 8/2020 | Goel | H04L 63/08 |
| 10,999,360 B2 | * | 5/2021 | Desbureaux | H04L 67/60 |
| 11,089,081 B1 | * | 8/2021 | Karppanen | H04L 67/01 |
| 11,409,622 B1 | * | 8/2022 | Kaushik | G06F 11/3034 |
| 11,552,948 B1 | * | 1/2023 | Peterson | H04L 63/0876 |
| 11,558,422 B2 | * | 1/2023 | Twitchell, Jr. | H04W 12/10 |
| 2001/0037461 A1 | * | 11/2001 | Conrath | H04L 63/083 726/7 |
| 2002/0165221 A1 | * | 11/2002 | Baxter | G01N 33/574 514/330 |
| 2002/0184510 A1 | * | 12/2002 | Shieh | H04L 47/10 713/185 |
| 2003/0026230 A1 | * | 2/2003 | Ibanez | H04L 61/5046 370/475 |
| 2003/0046420 A1 | * | 3/2003 | Breiter | H04L 9/40 709/237 |
| 2003/0060605 A1 | * | 3/2003 | Ware | A61P 31/22 530/391.1 |
| 2003/0079120 A1 | * | 4/2003 | Hearn | H04L 9/0825 709/229 |
| 2003/0118983 A1 | * | 6/2003 | Cassidy | G01N 33/5047 435/7.21 |
| 2003/0125274 A1 | * | 7/2003 | Gaarde | C12N 15/113 435/375 |
| 2003/0204619 A1 | * | 10/2003 | Bays | H04L 45/34 709/238 |
| 2003/0204769 A1 | * | 10/2003 | Coughlin | H04L 69/40 714/4.12 |
| 2003/0229718 A1 | * | 12/2003 | Tock | H04L 67/561 709/246 |
| 2004/0103310 A1 | * | 5/2004 | Sobel | H04L 63/105 709/223 |
| 2004/0143733 A1 | * | 7/2004 | Ophir | H04L 67/1097 713/153 |
| 2004/0152446 A1 | * | 8/2004 | Saunders | H04L 61/00 455/411 |
| 2004/0162905 A1 | * | 8/2004 | Griffin | G06F 21/6218 726/17 |
| 2004/0162906 A1 | * | 8/2004 | Griffin | H04L 63/10 709/229 |
| 2004/0186410 A1 | * | 9/2004 | Davidner | A61M 1/3683 424/140.1 |
| 2004/0221172 A1 | * | 11/2004 | Stamos | H04L 63/10 705/51 |
| 2005/0014796 A1 | * | 1/2005 | Baxter | A61K 31/44 514/408 |

(56) References Cited

U.S. PATENT DOCUMENTS

| | | | |
|---|---|---|---|
| 2005/0038874 A1* | 2/2005 | Ramaswamy | H04L 67/568 709/219 |
| 2005/0055578 A1* | 3/2005 | Wright | G06F 21/32 726/4 |
| 2005/0060537 A1* | 3/2005 | Stamos | H04L 43/0811 713/156 |
| 2005/0068983 A1* | 3/2005 | Carter | H04L 63/102 327/147 |
| 2005/0080138 A1* | 4/2005 | Guicherit | C07D 239/91 514/567 |
| 2005/0080746 A1* | 4/2005 | Zhu | H04L 67/104 705/59 |
| 2005/0081063 A1* | 4/2005 | Patrick | G06F 21/6218 726/4 |
| 2005/0085519 A1* | 4/2005 | Rubin | A61P 17/14 514/394 |
| 2005/0097353 A1* | 5/2005 | Patrick | H04L 63/20 726/26 |
| 2005/0125528 A1* | 6/2005 | Burke, II | G06Q 50/26 709/223 |
| 2005/0223183 A1* | 10/2005 | Pherson | H04L 63/101 711/163 |
| 2005/0229236 A1* | 10/2005 | Devgan | H04L 63/20 726/1 |
| 2005/0240758 A1* | 10/2005 | Lord | H04L 63/101 713/153 |
| 2005/0251851 A1* | 11/2005 | Patrick | G06F 21/604 726/1 |
| 2005/0251852 A1* | 11/2005 | Patrick | H04L 63/20 726/1 |
| 2005/0257245 A1* | 11/2005 | Patrick | H04L 63/0263 726/1 |
| 2005/0277863 A1* | 12/2005 | Davidner | A61M 1/3683 604/6.08 |
| 2006/0031942 A1* | 2/2006 | Jones | H04L 63/10 707/E17.001 |
| 2006/0045068 A1* | 3/2006 | Wu | H04L 61/2567 370/352 |
| 2006/0069914 A1* | 3/2006 | Rupp | H04L 63/0853 713/168 |
| 2006/0069916 A1* | 3/2006 | Jenisch | H04L 63/0846 713/172 |
| 2006/0075461 A1* | 4/2006 | Vayman | H04L 63/102 726/1 |
| 2006/0106011 A1* | 5/2006 | Bock | C07D 239/28 514/249 |
| 2006/0106936 A1* | 5/2006 | De Luca | H04L 63/102 709/228 |
| 2006/0128765 A1* | 6/2006 | Wood | C07D 233/22 514/357 |
| 2006/0143703 A1* | 6/2006 | Hopen | H04L 67/63 726/15 |
| 2006/0212700 A1* | 9/2006 | Zhang | H04W 12/084 713/167 |
| 2006/0286090 A1* | 12/2006 | Attardi | C07K 14/705 424/131.1 |
| 2006/0294596 A1* | 12/2006 | Govindarajan | H04L 63/10 726/28 |
| 2007/0002761 A1* | 1/2007 | Diamant | H04L 61/00 370/252 |
| 2007/0008937 A1* | 1/2007 | Mody | H04L 12/1467 370/338 |
| 2007/0010444 A1* | 1/2007 | Trupp | C07K 14/705 435/7.1 |
| 2007/0021493 A1* | 1/2007 | Guicherit | C07D 239/91 514/443 |
| 2007/0027878 A1* | 2/2007 | Droshev | G06F 9/547 |
| 2007/0094716 A1* | 4/2007 | Farino | H04L 63/101 726/5 |
| 2007/0226145 A1* | 9/2007 | Ishigaki | G06K 17/0022 705/51 |
| 2007/0234312 A1* | 10/2007 | Shepard | G06F 8/30 717/136 |
| 2007/0234329 A1* | 10/2007 | Shepard | G06F 8/74 717/163 |
| 2007/0263632 A1* | 11/2007 | Sobue | G06Q 40/08 370/395.2 |
| 2007/0271598 A1* | 11/2007 | Chen | H04L 63/08 726/17 |
| 2008/0014912 A1* | 1/2008 | Otaka | H04L 63/10 455/418 |
| 2008/0083040 A1* | 4/2008 | Dani | H04L 9/3231 726/28 |
| 2008/0098463 A1* | 4/2008 | Wikman | H04L 67/04 713/153 |
| 2008/0109884 A1* | 5/2008 | Kulkarni | G06F 21/31 726/5 |
| 2008/0141177 A1* | 6/2008 | Koo | H04L 63/104 715/853 |
| 2008/0222707 A1* | 9/2008 | Pathuri | G06F 21/62 726/4 |
| 2008/0313716 A1* | 12/2008 | Park | G06F 21/604 726/4 |
| 2009/0012082 A1* | 1/2009 | Guicherit | A61P 29/00 435/7.1 |
| 2009/0055900 A1* | 2/2009 | Gopalasetty | H04L 12/4633 726/4 |
| 2009/0067440 A1* | 3/2009 | Chadda | H04L 63/0227 370/401 |
| 2009/0119762 A1* | 5/2009 | Thomson | G07C 9/22 726/7 |
| 2009/0144807 A1* | 6/2009 | Zheng | H04W 12/08 726/3 |
| 2009/0171081 A1* | 7/2009 | Marfurt | G01N 27/3271 544/102 |
| 2009/0248846 A1* | 10/2009 | Cohn | H04L 45/76 709/223 |
| 2009/0300179 A1* | 12/2009 | Srinivasan | H04L 63/10 709/225 |
| 2009/0313357 A1* | 12/2009 | Kim | H04B 10/532 709/220 |
| 2009/0327908 A1* | 12/2009 | Hayton | G06F 21/44 715/744 |
| 2009/0327909 A1* | 12/2009 | Hayton | G06F 21/6218 715/744 |
| 2010/0031369 A1* | 2/2010 | Grummt | H04L 61/30 726/26 |
| 2010/0077454 A1* | 3/2010 | Xiao | H04L 9/3247 726/3 |
| 2010/0088507 A1* | 4/2010 | Cho | G06F 21/33 713/156 |
| 2010/0185614 A1* | 7/2010 | O'Brien | G06F 16/134 707/769 |
| 2010/0199086 A1* | 8/2010 | Kuang | H04L 63/0869 726/5 |
| 2010/0217173 A1* | 8/2010 | Hyde | A61M 1/3681 604/5.01 |
| 2010/0218265 A1* | 8/2010 | Bakhiet | C12N 15/113 800/13 |
| 2010/0246443 A1* | 9/2010 | Cohn | H04L 45/76 370/255 |
| 2010/0251329 A1* | 9/2010 | Wei | H04L 67/1001 726/1 |
| 2010/0303064 A1* | 12/2010 | Bari | H04L 63/205 370/352 |
| 2010/0305195 A1* | 12/2010 | Umeda | A61P 9/00 435/6.12 |
| 2011/0026531 A1* | 2/2011 | Deutsch | H04L 63/029 370/395.53 |
| 2011/0093939 A1* | 4/2011 | Barbour | G06F 21/40 726/16 |
| 2011/0099097 A1* | 4/2011 | Svedberg | H04L 12/1482 455/411 |
| 2011/0145926 A1* | 6/2011 | Dalcher | G06F 21/552 726/26 |
| 2011/0190196 A1* | 8/2011 | Bielicki | A61P 9/10 514/1.9 |

(56) References Cited

U.S. PATENT DOCUMENTS

| | | | |
|---|---|---|---|
| 2011/0231897 A1* | 9/2011 | Tovar | G06F 21/6218 726/1 |
| 2011/0231898 A1* | 9/2011 | Tovar | H04L 63/104 726/1 |
| 2011/0237495 A1* | 9/2011 | Serhan | C02F 9/00 514/16.7 |
| 2012/0011358 A1* | 1/2012 | Masone | G06F 21/305 713/153 |
| 2012/0015746 A1* | 1/2012 | Mooney | A63F 13/795 463/42 |
| 2012/0017009 A1* | 1/2012 | Short | H04L 67/00 709/238 |
| 2012/0023332 A1* | 1/2012 | Gorodyansky | H04L 63/105 713/168 |
| 2012/0072728 A1* | 3/2012 | Teather | H04L 63/0442 380/282 |
| 2012/0079590 A1* | 3/2012 | Sastry | H04L 63/10 726/21 |
| 2012/0110646 A1* | 5/2012 | Ajitomi | G06F 21/335 726/4 |
| 2012/0131652 A1* | 5/2012 | Anand | H04L 63/0823 726/5 |
| 2012/0159579 A1* | 6/2012 | Pineau | H04L 63/101 726/4 |
| 2012/0233314 A1* | 9/2012 | Jakobsson | G06Q 20/40155 709/224 |
| 2012/0291106 A1* | 11/2012 | Sasaki | G06F 21/556 726/5 |
| 2012/0297455 A1* | 11/2012 | Novak | G06F 21/6218 726/4 |
| 2012/0329703 A1* | 12/2012 | Bielicki | A61P 9/10 514/1.9 |
| 2013/0067568 A1* | 3/2013 | Obasanjo | G06F 21/31 726/20 |
| 2013/0086380 A1* | 4/2013 | Krishnaswamy | H04L 63/102 713/168 |
| 2013/0109737 A1* | 5/2013 | Young | G01N 33/6872 435/6.12 |
| 2013/0111044 A1* | 5/2013 | Cherian | H04L 65/1066 709/228 |
| 2013/0122526 A1* | 5/2013 | Foster | A61P 29/00 435/7.92 |
| 2013/0283340 A1* | 10/2013 | Biswas | H04L 63/20 726/1 |
| 2013/0291059 A1* | 10/2013 | Giambiagi | H04L 63/20 726/1 |
| 2013/0291077 A1* | 10/2013 | Sato | H04L 63/10 726/6 |
| 2013/0302283 A1* | 11/2013 | Kihm | A61P 11/00 424/93.3 |
| 2013/0332985 A1* | 12/2013 | Sastry | H04L 63/102 726/1 |
| 2014/0032758 A1* | 1/2014 | Barton | H04L 41/00 709/225 |
| 2014/0047048 A1* | 2/2014 | Ail | H04L 12/2809 709/206 |
| 2014/0059649 A1* | 2/2014 | Hu | H04L 63/08 726/3 |
| 2014/0075519 A1* | 3/2014 | Porras | H04L 63/107 726/4 |
| 2014/0096177 A1* | 4/2014 | Smith | H04L 63/08 726/1 |
| 2014/0096203 A1* | 4/2014 | Takahashi | H04L 63/101 726/4 |
| 2014/0096206 A1* | 4/2014 | Kaufmann | H04L 63/0227 726/4 |
| 2014/0130150 A1* | 5/2014 | Moshchuk | G06F 21/60 726/22 |
| 2014/0164761 A1* | 6/2014 | Kufluk | H04L 9/0872 726/4 |
| 2014/0170461 A1* | 6/2014 | Hwang | H01M 14/005 429/111 |
| 2014/0181889 A1* | 6/2014 | Black | H04L 63/0236 726/1 |
| 2014/0208393 A1* | 7/2014 | Yasukawa | H04L 61/2567 726/4 |
| 2014/0324946 A1* | 10/2014 | Zhang | H04L 67/10 709/203 |
| 2014/0337961 A1* | 11/2014 | Chien | H04L 63/10 726/12 |
| 2014/0343989 A1* | 11/2014 | Martini | H04L 63/104 705/7.17 |
| 2014/0380428 A1* | 12/2014 | Kobayashi | G06F 21/335 726/4 |
| 2015/0046973 A1* | 2/2015 | Gross | G06F 21/6218 726/1 |
| 2015/0074813 A1* | 3/2015 | Akula | H04L 67/10 726/26 |
| 2015/0106888 A1* | 4/2015 | Cheng | H04L 63/10 726/5 |
| 2015/0120577 A1* | 4/2015 | Lobo | G06Q 10/103 705/301 |
| 2015/0156205 A1* | 6/2015 | Yin | G06F 8/61 726/1 |
| 2015/0180829 A1* | 6/2015 | Yu | H04L 63/083 726/11 |
| 2015/0180872 A1* | 6/2015 | Christner | H04L 63/10 726/4 |
| 2015/0199510 A1* | 7/2015 | Krstic | H04L 63/10 713/189 |
| 2015/0215128 A1* | 7/2015 | Pal | H04L 63/0815 713/155 |
| 2015/0255803 A1* | 9/2015 | Delnick | H01M 4/9041 429/498 |
| 2015/0295757 A1* | 10/2015 | Debate | G06F 16/90335 709/226 |
| 2015/0319179 A1* | 11/2015 | Miasojed | H04L 63/0281 726/1 |
| 2015/0326578 A1* | 11/2015 | Hsu | H04L 63/108 726/9 |
| 2015/0341367 A1* | 11/2015 | Kus | G06F 21/6218 726/1 |
| 2015/0365412 A1* | 12/2015 | Innes | H04L 63/08 726/7 |
| 2015/0365417 A1* | 12/2015 | Bhooshan | H04L 63/101 726/3 |
| 2015/0379284 A1* | 12/2015 | Stuntebeck | G06Q 10/107 726/30 |
| 2015/0381598 A1* | 12/2015 | Koved | H04W 12/065 726/3 |
| 2015/0381631 A1* | 12/2015 | Salem | H04L 63/102 726/4 |
| 2016/0014157 A1* | 1/2016 | Gomez | H04L 63/10 726/1 |
| 2016/0021118 A1* | 1/2016 | Roth | H04L 9/088 726/4 |
| 2016/0052896 A1* | 2/2016 | Lindsley | C07D 403/12 544/122 |
| 2016/0057150 A1* | 2/2016 | Choi | H04L 63/104 726/1 |
| 2016/0094531 A1* | 3/2016 | Unnikrishnan | H04L 63/08 726/7 |
| 2016/0119348 A1* | 4/2016 | Kus | H04L 63/10 726/1 |
| 2016/0149764 A1* | 5/2016 | Brandwine | H04L 45/76 709/223 |
| 2016/0173448 A1* | 6/2016 | Olshansky | H04L 12/4641 726/4 |
| 2016/0179618 A1* | 6/2016 | Resch | G06F 11/0751 714/764 |
| 2016/0182565 A1* | 6/2016 | Salvador | H04L 63/08 726/1 |
| 2016/0212110 A1* | 7/2016 | Barkie | H04L 63/067 |
| 2016/0212113 A1* | 7/2016 | Banerjee | H04W 12/06 |
| 2016/0212132 A1* | 7/2016 | Banerjee | H04W 12/082 |
| 2016/0212141 A1* | 7/2016 | Banerjee | H04L 63/0846 |
| 2016/0219038 A1* | 7/2016 | Stephenson | H04W 12/068 |
| 2016/0219056 A1* | 7/2016 | Wang | G06F 21/6209 |

(56) References Cited

U.S. PATENT DOCUMENTS

| | | | |
|---|---|---|---|
| 2016/0239230 A1* | 8/2016 | Sato | H04L 43/08 |
| 2016/0269445 A1* | 9/2016 | Dotterer, III | H04W 12/086 |
| 2016/0277236 A1* | 9/2016 | Chen | H04L 67/102 |
| 2016/0315943 A1* | 10/2016 | Manjunath | H04L 63/102 |
| 2016/0364553 A1* | 12/2016 | Smith | H04L 63/0428 |
| 2016/0366183 A1* | 12/2016 | Smith | H04L 63/06 |
| 2016/0366188 A1* | 12/2016 | Smith | G06F 21/62 |
| 2016/0381144 A1* | 12/2016 | Malik | H04L 67/125 455/517 |
| 2017/0034272 A1* | 2/2017 | Kazi | G06F 21/6218 |
| 2017/0041432 A1* | 2/2017 | Damick | H04L 67/535 |
| 2017/0063813 A1* | 3/2017 | Cole | H04L 41/12 |
| 2017/0063859 A1* | 3/2017 | Shue | H04L 63/10 |
| 2017/0063931 A1* | 3/2017 | Seed | H04L 67/12 |
| 2017/0105171 A1* | 4/2017 | Srivastava | H04L 67/63 |
| 2017/0111338 A1* | 4/2017 | Malatesha | H04L 67/1097 |
| 2017/0111444 A1* | 4/2017 | Saheba | H04L 67/1012 |
| 2017/0126685 A1* | 5/2017 | Taylor | H04L 63/10 |
| 2017/0126686 A1* | 5/2017 | Totov | H04L 63/105 |
| 2017/0171183 A1* | 6/2017 | Lingappa | H04L 63/0435 |
| 2017/0181058 A1* | 6/2017 | Zeller | H04W 72/0446 |
| 2017/0187714 A1* | 6/2017 | Guo | H04L 67/02 |
| 2017/0193448 A1* | 7/2017 | Piyush | H04L 67/1044 |
| 2017/0230307 A1* | 8/2017 | Li | H04L 9/40 |
| 2017/0237724 A1* | 8/2017 | Kariyanahalli | H04L 63/123 726/4 |
| 2017/0244706 A1* | 8/2017 | Ren | H04L 63/0807 |
| 2017/0257217 A1* | 9/2017 | Davis | H04L 63/08 |
| 2017/0264634 A1* | 9/2017 | Carter | H04L 63/102 |
| 2017/0266362 A1* | 9/2017 | von Harten | B01D 63/02 |
| 2017/0272539 A1* | 9/2017 | Wozniak | G06F 16/24569 |
| 2017/0279795 A1* | 9/2017 | Redberg | H04L 63/0861 |
| 2017/0279813 A1* | 9/2017 | Vicente | H04L 63/101 |
| 2017/0310675 A1* | 10/2017 | Kodama | H04L 63/10 |
| 2017/0310754 A1* | 10/2017 | Baptist | G06F 3/0617 |
| 2017/0318009 A1* | 11/2017 | Pranam | H04L 63/0281 |
| 2017/0324825 A1* | 11/2017 | Long, III | H04L 63/102 |
| 2017/0366532 A1* | 12/2017 | Garfinkle | H04L 63/08 |
| 2018/0007059 A1* | 1/2018 | Innes | G06F 21/6218 |
| 2018/0070234 A1* | 3/2018 | Torvinen | H04L 63/08 |
| 2018/0109540 A1* | 4/2018 | Amar | H04L 63/0876 |
| 2018/0113626 A1* | 4/2018 | Baptist | H04L 67/1097 |
| 2018/0152441 A1* | 5/2018 | Tamura | H04L 63/0815 |
| 2018/0152478 A1* | 5/2018 | Zhou | H04L 63/10 |
| 2018/0167397 A1* | 6/2018 | Zhang | H04L 63/126 |
| 2018/0176210 A1* | 6/2018 | Comay | H04W 12/069 |
| 2018/0179163 A1* | 6/2018 | Kunos | A61P 3/06 |
| 2018/0183802 A1* | 6/2018 | Choyi | H04L 63/205 |
| 2018/0248888 A1* | 8/2018 | Takahashi | H04W 12/08 |
| 2018/0262510 A1* | 9/2018 | Su | G06F 21/6218 |
| 2018/0262512 A1* | 9/2018 | Zhao | H04L 63/102 |
| 2018/0295126 A1* | 10/2018 | Gilpin | H04L 63/102 |
| 2018/0309759 A1* | 10/2018 | Leibmann | H04L 63/105 |
| 2018/0314564 A1* | 11/2018 | Chilukuri | H04L 63/0815 |
| 2018/0332016 A1* | 11/2018 | Pandey | H04L 63/0428 |
| 2018/0351957 A1* | 12/2018 | Mott | H04L 63/20 |
| 2018/0367526 A1* | 12/2018 | Huang | H04L 63/0807 |
| 2019/0004910 A1* | 1/2019 | Guim Bernat | G06F 21/44 |
| 2019/0026807 A1* | 1/2019 | Terada | G06Q 30/0619 |
| 2019/0028485 A1* | 1/2019 | Baird | H04L 9/146 |
| 2019/0054125 A1* | 2/2019 | Kihm | A61K 35/545 |
| 2019/0058713 A1* | 2/2019 | Pala | H04L 63/105 |
| 2019/0074978 A1* | 3/2019 | Luff | H04L 9/30 |
| 2019/0075115 A1* | 3/2019 | Anderson | H04L 63/083 |
| 2019/0089710 A1* | 3/2019 | Weinert | H04L 9/3226 |
| 2019/0089810 A1* | 3/2019 | Wu | G06F 9/5005 |
| 2019/0097994 A1* | 3/2019 | Mathew | H04L 63/18 |
| 2019/0108333 A1* | 4/2019 | Licata | H04L 63/02 |
| 2019/0123674 A1* | 4/2019 | Embiricos | H04L 12/1822 |
| 2019/0132303 A1* | 5/2019 | Kurian | H04L 63/083 |
| 2019/0132322 A1* | 5/2019 | Song | H04L 63/101 |
| 2019/0156008 A1* | 5/2019 | Tamura | H04L 63/0892 |
| 2019/0173840 A1* | 6/2019 | Desai | H04L 67/56 |
| 2019/0199808 A1* | 6/2019 | Gamache | H04L 67/535 |
| 2019/0207945 A1* | 7/2019 | Yuan | H04L 63/101 |
| 2019/0223157 A1* | 7/2019 | Hwang | H04W 74/0833 |
| 2019/0238619 A1* | 8/2019 | Mantrana-Exposito | H04L 63/104 |
| 2019/0243969 A1* | 8/2019 | Birur | G06F 21/552 |
| 2019/0281052 A1* | 9/2019 | Lekkas | H04L 9/14 |
| 2019/0281064 A1* | 9/2019 | Patrich | H04L 63/10 |
| 2019/0288985 A1* | 9/2019 | Chambers | H04L 63/101 |
| 2019/0289002 A1* | 9/2019 | Vegh | H04L 63/0823 |
| 2019/0311140 A1* | 10/2019 | Braksator | G06F 16/903 |
| 2019/0319916 A1* | 10/2019 | Venkataramanan | H04L 67/131 |
| 2019/0325129 A1* | 10/2019 | Wang | G06F 21/604 |
| 2019/0334886 A1* | 10/2019 | Lelcuk | H04L 9/0637 |
| 2019/0334893 A1* | 10/2019 | Chen | H04W 92/12 |
| 2019/0334895 A1* | 10/2019 | J S A | H04L 63/0876 |
| 2019/0349360 A1* | 11/2019 | Yeddula | H04L 63/0807 |
| 2019/0356609 A1* | 11/2019 | Grunwald | G06F 16/275 |
| 2019/0372960 A1* | 12/2019 | Huang | H04L 63/061 |
| 2019/0379671 A1* | 12/2019 | Sundar | H04L 63/08 |
| 2019/0384916 A1* | 12/2019 | Shah | G06F 21/575 |
| 2020/0028838 A1* | 1/2020 | Yuan | H04W 12/08 |
| 2020/0028853 A1* | 1/2020 | Ford | H04L 63/105 |
| 2020/0045050 A1* | 2/2020 | Beveridge | H04L 63/0815 |
| 2020/0084217 A1* | 3/2020 | Judka | H04L 9/3239 |
| 2020/0092298 A1* | 3/2020 | Ojha | G06F 21/6227 |
| 2020/0100107 A1* | 3/2020 | Hsiao | H04L 9/3242 |
| 2020/0104521 A1* | 4/2020 | Malliah | G06F 16/90 |
| 2020/0106780 A1* | 4/2020 | Malliah | G06F 16/437 |
| 2020/0120100 A1* | 4/2020 | Hu | H04L 67/60 |
| 2020/0120135 A1* | 4/2020 | Hu | G06F 17/18 |
| 2020/0213107 A1* | 7/2020 | Choi | H04L 63/0435 |
| 2020/0220875 A1* | 7/2020 | Harguindeguy | H04L 63/101 |
| 2020/0252400 A1* | 8/2020 | Pike | G06F 21/42 |
| 2020/0258166 A1* | 8/2020 | Cross | G06Q 40/12 |
| 2020/0280588 A1* | 9/2020 | Greenebaum | H04L 63/102 |
| 2020/0287915 A1* | 9/2020 | Neuvirth | H04L 63/10 |
| 2020/0293684 A1* | 9/2020 | Harris | H04W 12/02 |
| 2020/0314200 A1* | 10/2020 | Grandjean | H04L 63/1441 |
| 2020/0336309 A1* | 10/2020 | Wang | G06F 21/33 |
| 2020/0336317 A1* | 10/2020 | Olivier | G06F 21/31 |
| 2020/0336398 A1* | 10/2020 | Thomas | H04L 43/0876 |
| 2020/0356401 A1* | 11/2020 | Su | H04L 41/40 |
| 2020/0358801 A1* | 11/2020 | Allouche | H04L 63/123 |
| 2020/0369773 A1* | 11/2020 | Whitfield | A61K 35/17 |
| 2020/0396223 A1* | 12/2020 | Dube | H04L 63/08 |
| 2020/0410082 A1* | 12/2020 | Sharieh | G06F 16/54 |
| 2020/0412735 A1* | 12/2020 | Suhail | H04L 63/105 |
| 2021/0032762 A1* | 2/2021 | Cronin | C25B 1/04 |
| 2021/0075794 A1* | 3/2021 | Gazit | H04L 63/1408 |
| 2021/0084048 A1* | 3/2021 | Kannan | H04L 63/104 |
| 2021/0091976 A1* | 3/2021 | Kim | H04L 12/4633 |
| 2021/0135872 A1* | 5/2021 | Laffey | H04L 9/0897 |
| 2021/0136071 A1* | 5/2021 | Koeten | H04L 63/102 |
| 2021/0144180 A1* | 5/2021 | Montazeri | H04L 63/102 |
| 2021/0144517 A1* | 5/2021 | Guim Bernat | H04W 12/04 |
| 2021/0144701 A1* | 5/2021 | Ly | H04L 27/2605 |
| 2021/0152542 A1* | 5/2021 | Gimenez Palop | G06F 21/45 |
| 2021/0160246 A1* | 5/2021 | Dubreil | H04L 63/083 |
| 2021/0160247 A1* | 5/2021 | Gaddam | H04L 67/306 |
| 2021/0203667 A1* | 7/2021 | Bondugula | H04L 63/08 |
| 2021/0211473 A1* | 7/2021 | Yancey | H04L 63/107 |
| 2021/0218742 A1* | 7/2021 | Cook | H04L 63/0815 |
| 2021/0328969 A1* | 10/2021 | Gaddam | G06F 21/44 |
| 2021/0352064 A1* | 11/2021 | Tsarfati | H04L 63/1416 |
| 2021/0352097 A1* | 11/2021 | Vlahovic | H04L 63/0884 |
| 2022/0038463 A1* | 2/2022 | Burlitskiy | G06F 21/43 |
| 2022/0060470 A1* | 2/2022 | Thomas | H04L 63/0815 |
| 2022/0103579 A1* | 3/2022 | Shi | H04L 61/4511 |
| 2022/0103638 A1* | 3/2022 | Kandikonda | H04L 41/082 |
| 2022/0159003 A1* | 5/2022 | Butcher | H04L 63/101 |
| 2022/0171842 A1* | 6/2022 | Jain | H04L 63/102 |
| 2022/0179869 A1* | 6/2022 | Gaur | G06F 16/2343 |
| 2022/0210168 A1* | 6/2022 | Yavo | H04L 63/1433 |
| 2022/0217779 A1* | 7/2022 | Taherzadeh Boroujeni | H04W 74/0833 |
| 2022/0225414 A1* | 7/2022 | Ma | H04W 74/006 |
| 2022/0232003 A1* | 7/2022 | Smolny | H04L 63/0807 |
| 2022/0239673 A1* | 7/2022 | Kfir | G06F 16/2365 |
| 2022/0247720 A1* | 8/2022 | Kim | H04L 12/4633 |

(56) References Cited

U.S. PATENT DOCUMENTS

| | | | |
|---|---|---|---|
| 2022/0247721 A1* | 8/2022 | Kim | H04L 63/029 |
| 2022/0272103 A1* | 8/2022 | Duryea | G06F 21/6218 |
| 2022/0317882 A1* | 10/2022 | Vijayan | G06F 3/065 |
| 2022/0317896 A1* | 10/2022 | Valan | G06F 3/067 |
| 2022/0334869 A1* | 10/2022 | Kremer | G06F 21/6218 |
| 2022/0337604 A1* | 10/2022 | Kim | H04L 63/0281 |
| 2022/0344002 A1* | 10/2022 | James | G01N 33/564 |

FOREIGN PATENT DOCUMENTS

| | | | | |
|---|---|---|---|---|
| CN | 111191279 A | | 5/2020 | |
| CN | 112202824 A | | 1/2021 | |
| CN | 112292669 A | | 1/2021 | |
| KR | 20070092196 A | * | 9/2007 | ......... H04L 63/0428 |
| WO | WO-2017136192 A1 | * | 8/2017 | ............ G06F 13/102 |

OTHER PUBLICATIONS

Fritsch et al "User Controlled Dynamic Access Credential Enrichment for Run-Time Service Selection," 2012 Ninth IEEE International Conference on e-Business Engineering, IEEE Computer Society, pp. 193-200 (Year: 2012).*

English Translation of CN107784221A (Year: 2018).*

Uriarte et al "Expressive Policy-Based Access Control for Resource-Constrained Devices," Special Section on Security and Privacy in Applications and Services for Future Internet of Things, Feb. 1, 2018, IEEE, pp. 15-46 (Year: 2018).*

Fritsch et al "User-Controlled Dynamic Access Credential Enrichment for Run-time Service Selection," 2012 Ninth IEEE International Conference on e-Business Engineering, pp. 193-200.*

El Kaed et al "On the Fly Proxy Generation for Home Devices Interoperability," pp. 1-5 (Year: 2011).*

Google Patents Translation of KR20070092196A (Year: 2007).*

Luo et al "Function Proxy: Template-Based Proxy Caching for Table-Value Functions," IEEE Computer Society, Proceedings of 20th International Conference on Data Engineering, (ICDE'04), p. 1 (Year: 2004).*

Wu et al "Towards the Scheduling of Access Requests in Cloud Storage," The 8th International Conference on Computer Science & Education (ICCSE 2013), IEEE, pp. 37-41 (Year: 2013).*

Yang et al "A Role-Based Access Control for Information Mediation," IEEE, pp. 277-282 (Year: 2004).*

Ezziyyani et al "Security Techniques and Specifications for the Resources Protection in Mediation Systems," IEEE Melecon 2006, pp. 824-827 (Year: 2006).*

Lin et al "Developing Reliable Mediators for Web Service Interactions," Fourth International Conference on Semantics, Knowledge and Grid, IEEE Computer Society, pp. 449-452 (Year: 2008).*

Zhang et al "A User-Centric WS-Mediator framework for on-the-fly Web Service Composition," 19th Telecommunications forum TELFOR 2011, IEEE, pp. 1499-1502 (Year: 2011).*

* cited by examiner

METHOD AND SYSTEM FOR PROCESSING NETWORK RESOURCE ACCESS REQUESTS, AND COMPUTER DEVICE

BACKGROUND OF THE INVENTION

1. Technical Field

The present invention relates to the technical field of network security, in particular to a method and system for processing network resource access requests, and a computer device.

2. Description of Related Art

At present, in existing network resource access system, a typical network resource access method is as follows: with a user terminal, a user accesses a network resource through an access gateway. In this solution, the user terminal connects to the network resource through the gateway; in other words, there is always an access channel between the two. Once the gateway fails, has vulnerabilities or is compromised due to hacker attack, the network resource will not be protected, and the overall security is relatively poor.

BRIEF SUMMARY OF THE INVENTION

In view of the above existing problems, the objective of the present invention is to provide a method and system for processing network resource access requests, and a computer device to improve the network security.

To fulfill the above objective, the present invention is realized through the following technical solution:

In one aspect of the present invention, a method for processing network resource access requests comprises:
  receiving a resource access request and acquiring resource access request information;
  extracting user information and target resource information from the resource access request information, and requiring to establish a corresponding access mediator instance according to the user information and the target resource information;
  establishing the access mediator instance; and
  initiating an access to a target resource correspondingly by using the access mediator instance according to the resource access request information received by the access mediator instance.

Preferably, the method for processing network resource access requests further comprises:
  receiving a response of the target resource by using the access mediator instance and transferring the response to a user terminal; and
  deleting the access mediator instance after a resource access session is finished.

Preferably, establishing the access mediator instance specifically comprises:
  selecting a corresponding access mediator template according to a request for establishing the access request mediator instance, generating a corresponding access mediator instance according to the access mediator template, and starting and configuring the access mediator instance;
  or, selecting a corresponding access mediator template according to a request for establishing the access request mediator instance, generating a corresponding access mediator instance according to the access mediator template, and starting the access mediator instance.

Preferably, selecting the corresponding access mediator template specifically comprises:
  selecting the corresponding access mediator template according to the user information and the target resource information to guarantee terminal adaptation and resource adaptation.

In the other aspect of the present invention, a computer device comprises: a memory and a processor that are in a communication connection, and a computer program stored in the memory and to be run on the processor, wherein when the computer program is run by the processor, the method mentioned above is implemented.

In another aspect of the present invention, a method for processing network resource access requests comprises:
  receiving a resource access request and acquiring resource access request information;
  extracting target resource information from the resource access request information, and requiring to establish a corresponding access mediator instance according to the target resource information;
  establishing the access mediator instance; and
  initiating an access to a target resource correspondingly by using the access mediator instance according to the resource access request information received by the access mediator instance.

Preferably, the processing method further comprises:
  receiving a response of the target resource by using the access mediator instance and transferring the response to a user terminal; and
  deleting the access mediator instance after a resource access session is finished.

Preferably, establishing the access mediator instance specifically comprises:
  selecting a corresponding access mediator template according to a request for establishing the access request mediator instance, generating a corresponding access mediator instance according to the access mediator template, and starting and configuring the access mediator instance;
  or, selecting a corresponding access mediator template according to a request for establishing the access request mediator instance, generating a corresponding access mediator instance according to the access mediator template, and starting the access mediator instance.

Preferably, selecting the corresponding access mediator template specifically comprises:
  selecting the corresponding access mediator template according to the target resource information to guarantee resource adaptation.

In the other aspect of the present invention, a computer device, comprising: a memory and a processor in a communication connection, and a computer program stored in the memory and to be run on the processor, wherein when the computer program is run by the processor, the method mentioned above is implemented.

In another aspect of the present invention, a system for processing network resource access requests comprises:
  a request receiver for receiving a resource access request and acquiring resource access request information;
  a request processor for extracting user information and target resource information from the resource access request information and requiring to establish a corresponding access mediator instance according to the user information and the target resource information on the one hand, and initiating an access to the target resource correspondingly via the access mediator instance according to the resource access request information after establishing the access mediator instance on the other hand; and an access mediator manager for establishing the access mediator instance.

Preferably, the system further comprises:

a response processor for receiving a response of the target resource transferred by the access mediator instance; and a response sender for sending the response of the target resource transferred by the access mediator instance to a user terminal.

Preferably, the access mediator manager is further used for deleting the access mediator instance after a resource access session is finished.

Preferably, establishing the access mediator instance specifically comprises:

selecting a corresponding access mediator template according to a request for establishing the access request mediator instance, generating a corresponding access mediator instance according to the access mediator template, and starting and configuring the access mediator instance;

or, selecting a corresponding access mediator template according to a request for establishing the access request mediator instance, generating a corresponding access mediator instance according to the access mediator template, and starting the access mediator instance.

Preferably, selecting the corresponding access mediator template specifically comprises:

selecting the corresponding access mediator template according to the user information and the target resource information to guarantee terminal adaptation and resource adaptation.

In yet another aspect of the present invention, a system for processing network resource access requests comprises:

a request receiver for receiving a resource access request and acquiring resource access request information;

a request processor for extracting target resource information from the resource access request information and requiring to establish a corresponding access mediator instance according to the target resource information on the one hand, and initiating an access to the target resource correspondingly via the access mediator instance according to the resource access request information after establishing the access mediator instance on the other hand; and an access mediator manager for establishing the access mediator instance.

Preferably, the system further comprises:

a response processor for receiving a response of the target resource transferred by the access mediator instance; and a response sender for sending the response of the target resource transferred by the access mediator instance to a user terminal.

Preferably, the access mediator manager is further used for deleting the access mediator instance after a resource access session is finished.

Preferably, establishing the access mediator instance specifically comprises:

selecting a corresponding access mediator template according to a request for establishing the access request mediator instance, generating a corresponding access mediator instance according to the access mediator template, and starting and configuring the access mediator instance;

or, selecting a corresponding access mediator template according to a request for establishing the access request mediator instance, generating a corresponding access mediator instance according to the access mediator template, and starting the access mediator instance.

Preferably, selecting the corresponding access mediator template specifically comprises:

selecting the corresponding access mediator template according to the target resource information to guarantee terminal adaptation and resource adaptation.

The present invention has the beneficial effects:

1. By means of the solution of the present invention, a resource access channel exclusive to the resource access request is established according to the access mediator instance temporarily generated by the resource access request. Before the access mediator instance is started and configured, the access channel is not established between the user terminal and the target resource, and after the access mediator instance is started and configured, the resource access channel exclusive to the resource access is established, and the resource access request arrives at the target resource by the access mediator instance; that is, an exclusive access channel is dynamically established according to the resource access request; compared with a solution that a static access channel always exists between the user terminal and the target resource in the prior art, the network security may be improved greatly.

2. The corresponding access mediator template is selected according to the user information and the target resource information to generate the access mediator instance, so that the access mediator instance is matched with the user, the user terminal and the target resource, and user experience is guaranteed.

3. By accessing the target resource through the exclusive access mediator instance, the user terminal is not directly interacted with the target resource, so that the target source is protected against attack threats from the user terminal, data leakage is avoided, and the user terminal is protected against hazards caused by malicious contents from the target resource.

4. After the resource access request and the corresponding response are finished, the access mediator instance is deleted, so that on the one hand, when a next resource access request is initiated, the access channel will not be established between the user terminal and the target resource, and the resource access request may not be sent to the target resource, and thus, the user experience is guaranteed and the system security is improved; and on the other hand, it is guaranteed that the access mediator instance generated by each resource access request is only used once, so that the defect that a static access channel in the prior art is likely to be attacked can be effectively avoided.

DETAILED DESCRIPTION OF THE INVENTION

Figure 1:
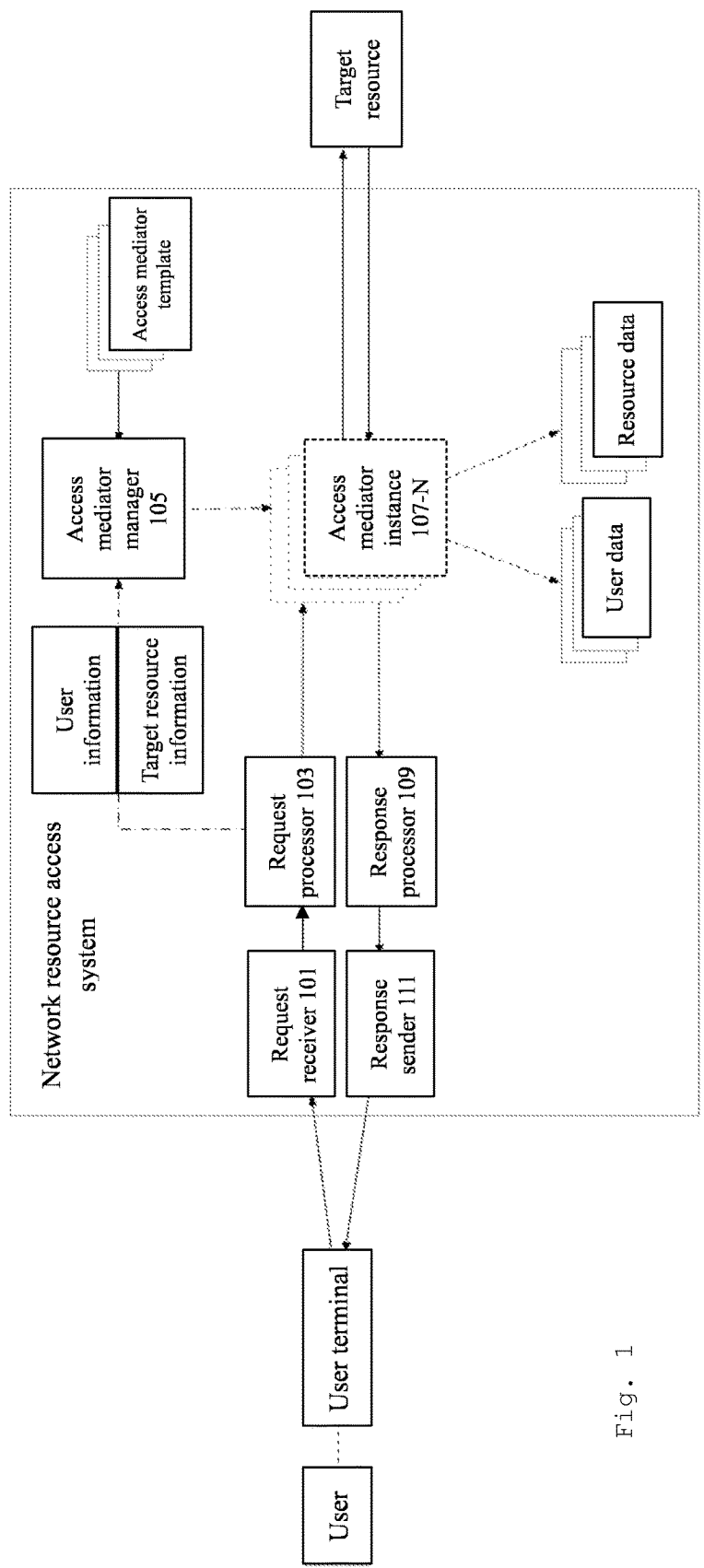
FIG. 1 is a structural schematic diagram of a system for processing network resource access requests of the present invention.

To better clarify the purposes, technical solutions and advantages of the embodiments of the present invention, the technical solutions of the embodiments of the invention will be clearly and completely described. Obviously, the embodiments in the following description are merely illustrative ones, and are not all possible ones of the invention. All other embodiments obtained by those ordinarily skilled in the art without creative labor should also fall within the protection scope of the invention.

A resource access channel exclusive to the resource access request is established according to the exclusive access mediator instance temporarily generated by the resource access request, and after the resource access session is finished, the access mediator instance is deleted. That is to say, the system dynamically selects and configures or directly dynamically selects the access mediator substance for accessing the target resource according to the target resource information in the resource access request or the user information and the target resource information in the resource access request. Before the access mediator substance is started and configured (corresponding to the condition where the access mediator substance needs to be configured) or before the access mediator substance (corresponding to the condition where the access mediator substance does not need to be additionally configured, for example, an access mediator instance is merely used for accessing a certain specific website, and after the access mediator instance is started, it is not needed to configure the access mediator instance, and the aforementioned specific website may be directly accessed by the access mediator instance) is started, the access channel will not be established between the user terminal and the target resource. After the access mediator instance is started and configured (similarly, corresponding to a condition needed to configure the access mediator substance) or the access mediator instance is started (similarly, corresponding to a condition not needed to configure the access mediator substance additionally), the resource access channel exclusive to the resource access request is established, and the resource access request arrives at the target resource by means of the access mediator instance. After the resource access request session is finished, the access mediator instance is deleted. When a next resource access request is initiated, the access channel will not be established between the user terminal and the target resource, and the resource access request may not be sent to the target resource, so that the user experience is guaranteed and the system security is improved.

For the sake of a good understanding, the relationship between the access request and the access request information is defined here as follows: the access request is to add information for network transmission, such as a network communication transmission format and session information, based on the access request information.

Figure 2:
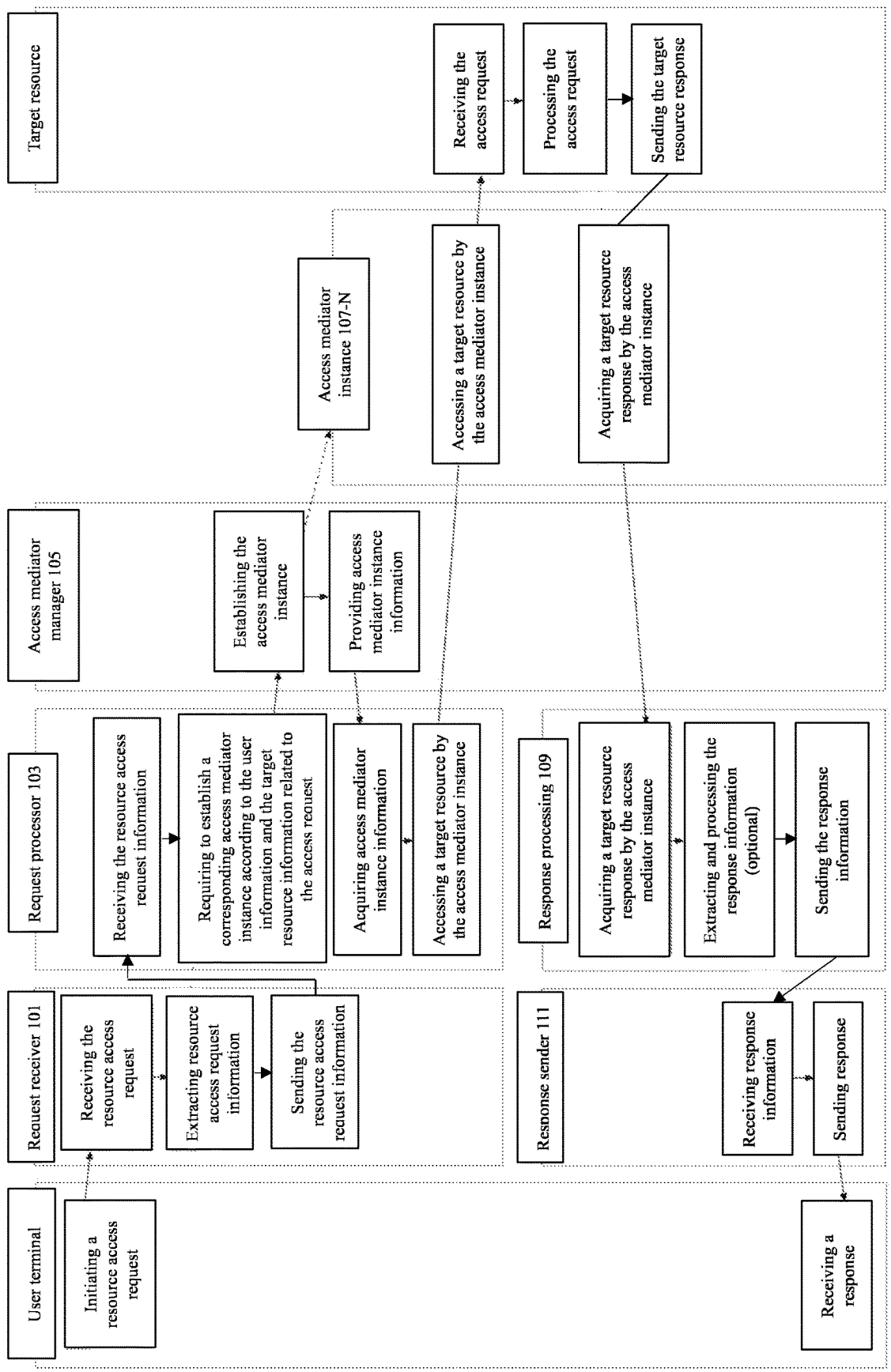
FIG. 2 is a sequence diagram of a processing procedure of a system for processing network resource access requests of the present invention.

As shown in FIG. 1 and FIG. 2, this embodiment provides a system for processing network resource access requests, comprising:

a request receiver 101, configured for receiving a resource access request, acquiring resource access request information and sending the acquired resource access request information to a request processor 103. The request receiver 101 not only receives the resource access request directly sent by the user via the user terminal, but also receives the resource access request initiated by the user terminal and transferred by a network proxy service.

The request processor 103, on the one hand, is configured for extracting the user information and the target resource information from the received resource access request information and requiring the access mediator manager 105 to establish the corresponding access mediator instance 107-N according to the user information and the target resource information (it may comprise at least two different conditions: one condition is as follows: after the access mediator instance is generated, in a resource access process, a default configuration of the access mediator instance is used without configuring the access mediator instance additionally; for example, an access mediator instance is merely used for accessing a certain specific website, and after the access mediator instance is started, it is not needed to configure the access mediator instance, and the aforementioned specific website may be directly accessed by the access mediator instance. The other condition is as follows: after the access mediator instance is generated, it is needed to configure the access mediator instance correspondingly to realize resource access, specifically illustrated hereinafter). On the other hand, it is configured to initiate access correspondingly to the target resource via the access mediator instance 107-N according to the resource access request information after the access mediator instance 107-N is established. Functions of the access mediator instance 107-N are similar to those of an access gateway which may perform processing including address conversion, protocol conversion, identity authentication and the like. The user information comprises at least one of information such as a user name, a user terminal type, a user department and a user group. The target resource information comprises at least one of information such as a resource identifier, a resource type (a webpage, a network document, a network application and the like) and a network address.

The access mediator manager 105 is configured for selecting the corresponding access mediator template according to the received information (such as a request from the request processor 103), generating the corresponding access mediator instance 107-N according to the access mediator template (in this embodiment, the relationship between the access mediator template and the access mediator instance is similar to the relationship between a Docker mirror image in a Docker application container engine and a Docker container), and starting and configuring the access mediator instance or starting the access mediator instance without extra configuration.

In an optional scope of those skilled in the art, selecting the corresponding access mediator template according to the received information may further be finished by the request processor 103. In this case, the request processor 103 is configured for extracting the user information and the target resource information from the received resource access request information, selecting the corresponding access mediator template according to the user information and the target resource information and requiring the access mediator manager 105 to generate and configure the corresponding access mediator instance 107-N according to the access mediator template selected by the request processor 103. The access mediator manager 105 is configured to generate the corresponding access mediator instance 107-N according to the access mediator template, and start and configure the access mediator instance or start the access mediator instance without extra configuration.

For the sake of a good understanding, selecting the corresponding access mediator template is illustrated below:

For example, the user accesses the access mediator instance needed by a website via a mobile phone, which is different from accessing the access mediator instance needed by a document (the document may be a word document, a PDF document or the like) on a network via a PC (Personal Computer). When the access mediator template is selected, it is needed to select the corresponding access mediator template according to the terminal type (one of the user information) to guarantee terminal adaptation, and it is also needed to select the corresponding access mediator template according to the target resource type (one of the target resource information) to guarantee that the access mediator template is adaptive to the resource type, so as to realize normal presentation of the resource information. That is, the user accesses different resources (such as a website, a document on the network, an application on the network and the like) via different user terminals (such as a mobile phone, a tablet personal computer, a PC and the like) with different access mediator instances, so that it is needed to select the corresponding access mediator template according to the user information and the target resource information. In the optional scope of those skilled in the art, when the access mediator template is selected, the user information is not limited to the terminal type, and the target resource information is further not limited to the resource type.

For the sake of a good understanding, configuring the access mediator instance is illustrated below:

When the resource access request is a website on the access network, an implementation for configuring the access mediator instance is to configure a web address of the website to the access mediator instance by the access mediator manager 105.

When the resource access request is a website on the access network and needs to support the user to download a document from the website or upload the document to the website, an implementation for configuring the access mediator instance is to configure a web address of the website and a network disc menu of the user to the access mediator instance by the access mediator manager 105.

When the resource access request is an application on the access network and needs to support the user to process certain data by using the application, an implementation for configuring the access mediator instance is to configure a web address of the application and data needed to be processed to the access mediator instance by the access mediator manager 105. The data may be merely data from the user or may comprise the resource data from the network or the data associated with the target resource. For example, when the user needs to process a picture on the network disc by means of a photoshop server on the network, an implementation for configuring the access mediator instance is to configure an address and an access mode (such as a user name, a password or the like), an address of the picture on the network disc and an access mode (such as a user name, a password or the like) to the access mediator instance by the access mediator manager 105.

When the network resource is accessed by using the system for processing network resource access requests in this embodiment, before the access mediator substance is started and configured (corresponding to the condition where the access mediator substance needs to be configured) or before the access mediator substance (corresponding to the condition where the access mediator substance does not need to be additionally configured) is started, the access channel will not be established between the user terminal and the target resource. After the access mediator instance is started and configured (similarly, corresponding to the condition where the access mediator substance needs to be configured) or the access mediator instance is started (similarly, corresponding to the condition where the access mediator substance does not need to be additionally configured), the resource access channel exclusive to the resource access request is established, and the resource access request arrives at the target resource by means of the access mediator instance. Compared with the solution that an access channel always exists between the user terminal and the target resource in the prior art, the network security may be improved greatly. Meanwhile, by accessing the target resource by using the exclusive access mediator instance, the user terminal is not directly interacted with the target resource, so that the target source is protected against attack threats from the user terminal, data leakage is prevented, and the user terminal is protected against hazards caused by malicious contents from the target resource.

As a preferred implementation of this embodiment, in order to realize a closed loop of the network resource access, the system for processing network resource access requests further comprise:

a response processor 109 for receiving a response of the target resource transferred by the access mediator instance and transmitting the response to the response sender 111; and the response sender 111 for sending the response transmitted by the response processor 109 to the user terminal as the response to the resource access request, so that the request and response process of the whole access is finished.

More preferably, the response processor 109 may further be used for processing the received response to obtain information in an image coded format (see Chinese Invention Patent Application No. 202011413791.2 for a specific solution) and sending the information as the response information to the response sender 111.

Preferably, the access mediator manager 105 is further configured to delete the access mediator instance after a resource access session is finished. That is, the exclusive access mediator instance generated according to the resource access request is merely suitable for the resource access session, after the resource access request session is finished, the access mediator instance will be deleted immediately. When a next resource access request is initiated, the access channel will not be established between the user terminal and the target resource, and the resource access request will not be sent to the target resource, thus guaranteeing the system security.

As another preferred implementation of this embodiment, The request processor 103 is further configured for judging the legality of the resource access request information. Under the circumstance that the resource access request information is legal, the extracted user information and target resource information are sent to the access mediator manager 105.

Figure 3:
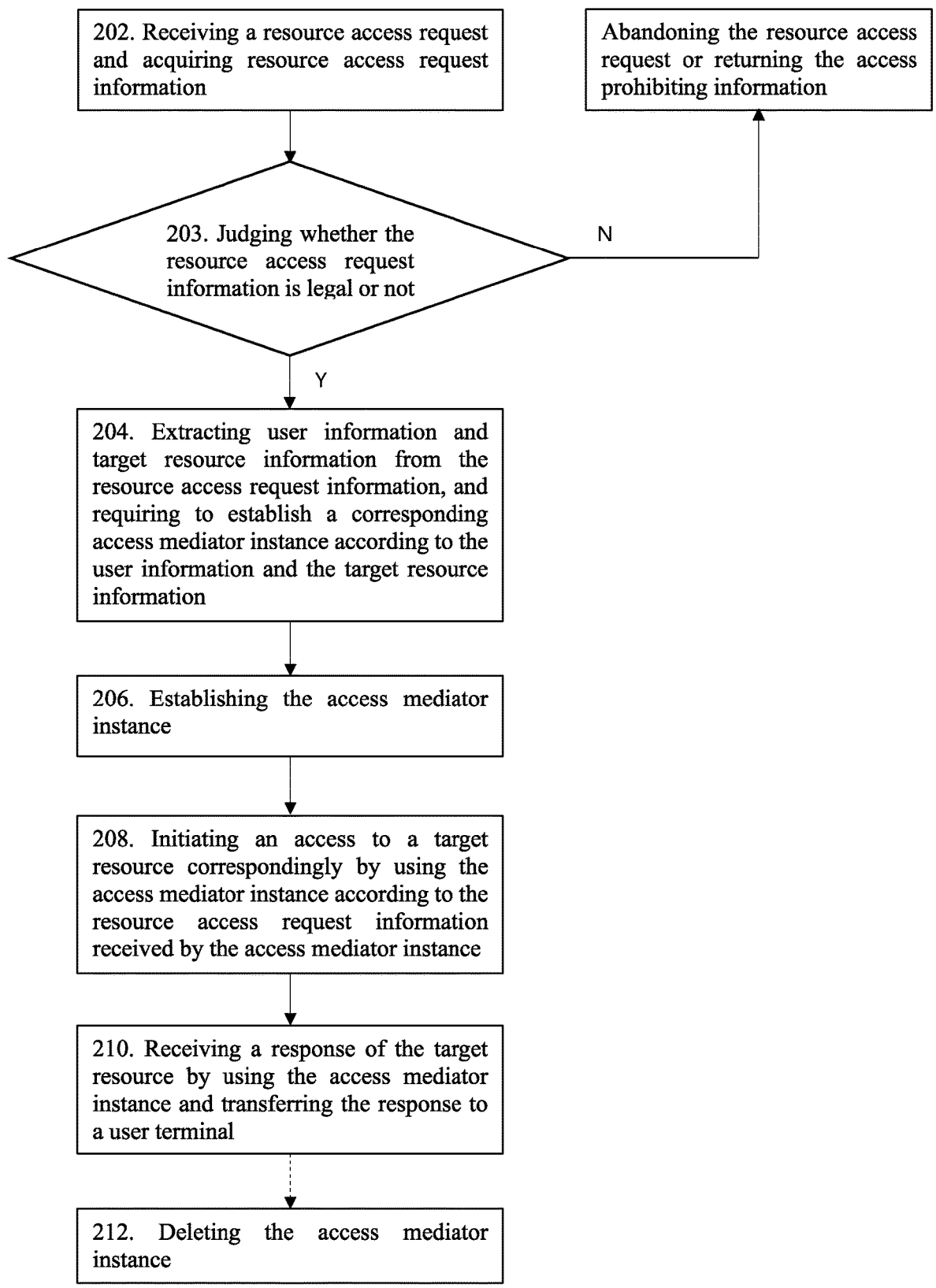
FIG. 3 is a flow diagram of a method for processing network resource access requests of the present invention.

As shown in FIG. 3, this embodiment provides a method for processing network resource access requests, comprising:

202. A resource access request is received and resource access request information is acquired.

In this embodiment, this step is realized by the request receiver 101 in the system for processing network resource access requests. The resource access request is directly from the user terminal or is transferred from the network proxy service. For example, the user operates the user terminal by operation to require to access a certain website, and the user terminal responds to the operation to generate the corresponding resource access request.

204. User information and target resource information are extracted from the resource access request information, and it is required to establish a corresponding access mediator instance according to the user information and the target resource information.

In this embodiment, this step is realized by the request processor 103 in the system for processing network resource access requests (the request receiver will transfer the resource access request information to the request processor). The user information comprises at least one of information such as a user name, a user terminal type, a user department and a user group. The target resource information comprises at least one of information such as a resource identifier, a resource type (a webpage, a network document, a network application or the like) and a network address.

Specifically, establishing the access mediator instance may comprise at least two different conditions: one condition is as follows: after the access mediator instance is generated, in a resource access process, a default configuration of the access mediator instance is used without configuring the access mediator instance additionally; for example, an access mediator instance is merely used for accessing a certain specific website, and after the access mediator instance is started, it is not needed to configure the access mediator instance, and the aforementioned specific website may be directly accessed by the access mediator instance. The other condition is as follows: after the access mediator instance is generated, it is needed to configure the access mediator instance correspondingly to realize resource access, specifically illustrated hereinafter.

206. The access mediator instance is established.

In this embodiment, this step is realized by the access mediator manager 105 in the system for processing network resource access requests.

Specifically, the access mediator manager 105 selects the corresponding access mediator template according to the received information (such as a request from the request processor 103 to require to establish the access mediator instance), generates the corresponding access mediator instance 107-N according to the access mediator template (in this embodiment, the relationship between the access mediator template and the access mediator instance is similar to the relationship between a Docker mirror image in a Docker application container engine and a Docker container), and starts and configures the access mediator instance or starts the access mediator instance without extra configuration.

In the optional scope of those skilled in the art, establishing the access mediator instance may further comprises: the access mediator manager 105 generates the corresponding access mediator instance 107-N according to the access mediator template determined by the request processor 103, and starts and configures the access mediator instance or start the access mediator instance without extra configuration. In this case, the request processor 103 is configured to extract the user information and the target resource information from the received resource access request information, select the corresponding access mediator template according to the user information and the target resource information and require the access mediator manager 105 to generate and configure the corresponding access mediator instance 107-N according to the access mediator template selected thereby.

For the sake of a good understanding, selecting the corresponding access mediator template is illustrated below:

For example, the user accesses the access mediator instance needed by a website via a mobile phone, which is different from accessing the access mediator instance needed by a document (the document may be a word document, a PDF document or the like) on a network via a PC (Personal Computer). When the access mediator template is selected, it is needed to select the corresponding access mediator template according to the terminal type (one of the user information) to guarantee terminal adaptation, and it is needed to select the corresponding access mediator template according to the target resource type (one of the target resource information) to guarantee that the access mediator template is adaptive to the resource type, so as to realize normal presentation of the resource information. That is, the user accesses different resources (such as a website, a document on the network, an application on the network and the like) via different user terminals (such as a mobile phone, a tablet personal computer, a PC and the like) with different access mediator instances, so that it is needed to select the corresponding access mediator template according to the user information and the target resource information. In the optional scope of those skilled in the art, when the access mediator template is selected, the user information is not limited to the terminal type and the target resource information is further not limited to the resource type.

For the sake of a good understanding, configuring the access mediator instance is illustrated below:

When the resource access request is a website on the access network, an implementation for configuring the access mediator instance is to configure a web address of the website to the access mediator instance by the access mediator manager 105.

When the resource access request is a website on the access network and needs to support the user to download a document from the website or upload the document to the website, an implementation for configuring the access mediator instance is to configure a web address of the website and a network menu of the user to the access mediator instance by the access mediator manager 105.

When the resource access request is an application on the access network and needs to support the user to process certain data by using the application, an implementation for configuring the access mediator instance is to configure a web address of the application and data needed to be processed to the access mediator instance by the access mediator manager 105. The data may be merely data from the user or may comprise the resource data from the network or the data associated with the target resource. For example, when the user needs to process a picture on the network disc by means of a photoshop server on the network, an implementation for configuring the access mediator instance is to configure an address and an access mode (such as a user name, a password or the like), an address of the picture on the network disc and an access mode (such as a user name, a password or the like) to the access mediator instance by the access mediator manager 105.

208. An access is initiated to a target resource correspondingly by using the access mediator instance according to the resource access request information received by the access mediator instance.

Functions of the access mediator instance 107-N are similar to those of an access gateway which may perform processing including address conversion, protocol conversion and the like.

As a preferred implementation of the method for processing network resource access requests of this embodiment, the method further comprises:

210. A response of the target resource is received by using the access mediator instance and the response is transferred to a user terminal.

In this embodiment, the response from the target resource received by the access mediator instance 107-N is transferred to the user terminal via the response processor 109 and the response sender 111 in sequence.

As a more preferred implementation, in this process, the received response may further be processed by the response processor 109 to obtain information in an image coded format (see Chinese Invention Patent Application No. 202011413791.2 for a specific solution), and the information is sent as the response information to the response sender 111.

212. The access mediator instance is deleted.

In this embodiment, this step is realized by the access mediator manager 105 in the system for processing network resource access requests. After the resource access request session is finished, the access mediator manager 105 deletes the access mediator instance immediately, so that when a next resource access request is initiated, the access channel will not be established between the user terminal and the target resource, the resource access request will not be sent to the target resource, thus guaranteeing the system security.

As a preferred implementation scheme of the processing method for the network resource access request of the embodiment, the processing method further comprises:

203. The legality of the resource access request information is judged. If it is legal, Step 204 is executed, and otherwise, the resource access request is abandoned or access prohibiting information is returned.

In this embodiment, this step is realized by the request processor 103 in the system for processing network resource access requests.

Based on this implementation, in the optional scope of those skilled in the art, in order to simplify the processing flow to use the specific user terminal (such as the PC or the mobile phone) to access resources by any user in any condition, the request processor 103 may merely extract the target resource information selectively rather than extracting the user information (the user information is extracted primarily for authority management and terminal adaptation).

What is claimed is:

1. A method for processing network resource access requests, comprising:

receiving, a resource access request and acquiring resource access request information;

extracting user information and target resource information from the resource access request information, and requiring to establish a corresponding access mediator instance according to the user information and the target resource information;

dynamically establishing the access mediator instance on demand;

establishing, using the access mediator instance, a resource access channel exclusive to the resource access request; and initiating an access to a target resource correspondingly through the resource access channel;

receiving a response of the target resource by using the access mediator instance and transferring the response to a user terminal; and deleting the access mediator instance after a resource access session is finished;

wherein establishing the access mediator instance specifically comprises:

wherein the network resource access requests are to a target resource when no access channel is available between the target resource and a user terminal or to a target resource that cannot be accessed directly from a user terminal;

selecting a corresponding access mediator template according to a request for establishing the access request mediator instance, generating a corresponding access mediator instance according to the access mediator template, and starting and configuring the access mediator instance;

wherein selecting a corresponding access mediator template specifically comprises:

selecting the corresponding access mediator template according to the user information and the target resource information to provide adaptive resources to the user terminal; and wherein the user information comprises at least one of a user name, a user terminal type, a user department and a user group, and the target resource information comprises at least one of resource identifier, a resource type and a network address.

* * * * *